United States Patent [19]

Komatsubara et al.

[11] Patent Number: 4,926,213
[45] Date of Patent: May 15, 1990

[54] APPARATUS FOR HOLDING SENSITIZED MATERIAL IN SLITWISE EXPOSURE TYPE COPYING CAMERA

[75] Inventors: Shoji Komatsubara; Masahiko Takeuchi; Yasuyuki Oka, all of Shiga, Japan

[73] Assignee: Dainippon Screen Mfg. Co., Ltd., Kyoto, Japan

[21] Appl. No.: 241,627

[22] Filed: Sep. 8, 1988

[30] Foreign Application Priority Data

Sep. 11, 1987 [JP] Japan ................... 62-229151
Sep. 22, 1987 [JP] Japan ................... 62-238236

[51] Int. Cl.$^5$ ............................. G03B 27/50
[52] U.S. Cl. ................... 355/49; 355/51; 355/60; 355/65
[58] Field of Search ................ 355/51, 54, 57, 60, 355/72, 73, 49, 233, 243, 212

[56] References Cited

U.S. PATENT DOCUMENTS 4,636,059 1/1987 Thompson ................ 355/45 X

FOREIGN PATENT DOCUMENTS 189939 1/1986 European Pat. Off.

Primary Examiner—L. T. Hix
Assistant Examiner—D. Rutledge
Attorney, Agent, or Firm—Ostrolenk, Faber, Gerb & Soffen

[57] ABSTRACT

A camera includes a holder (1) for holding an original, an optical system (10) for optically scanning the original to form an image thereof, a mechanism (6) for moving the optical system and the holder with respect to each other, and a cylindrical drum (8) for conveying sensitized material (21) in synchronization with the mechanism (6) to record the image of the original on the sensitized material (21) in a continuous slitwise manner. The sensitized material (21) is conveyed while held by static electricity or vacuum attraction. The camera is capable of variable magnification.

10 Claims, 5 Drawing Sheets

4,926,213

APPARATUS FOR HOLDING SENSITIZED MATERIAL IN SLITWISE EXPOSURE TYPE COPYING CAMERA

BACKGROUND OF THE INVENTION

1. Field of the Invention

The present invention relates to a slitwise exposure type copying camera and, more specifically, to an apparatus for holding a sensitized material in the slitwise exposure type copying camera.

2. Description of the Prior Art

It is known to use a camera to form a plate (which can be used for subsequent reproduction) from an original. The camera is generally larger than a normal copying machine. The camera should provide images of very high quality, it must be handled under daylight conditions, and it should occupy as small an area as possible. For these reasons, the slitwise exposure technique has been employed in such cameras.

A camera of this type is illustrated in FIG. 1. This camera was developed by the inventor of the present invention.

The conventional slitwise exposure type copying camera includes a holder 101 for holding an original 103 in a flat position; a holder 108 for holding sensitized material 121 so that the material 121 is parallel to the original 103; a projecting optical system 110 which includes an original illuminating system which is movable with respect to the holder 101 and the holder 108; and a conveying device 120 for feeding-discharging the sensitized material 121 and from the holder 108. The projecting optical system 110 runs between the original holder 101 and the sensitized material holder 108 to projecting slitwise images of the original 103 on the sensitized material 121. A developing apparatus 137 may be provided below the body of the camera.

The sensitized material holder 108 and the original holder 101 are parallel to each other so that the space occupied by the whole apparatus is small. Since the optical system 110 runs between the holder 101 and the holder 108 and since both holders are stationary, the image of the original 103 is scanned and exposed on the sensitized material 121. The structure illustrated in FIG. 1 is suitable for equal scale magnification. For variable scale magnification, an appropriate optical system and the like should be provided between the sensitized material holder 108 and the original holder 101. This enlarges the apparatus because of the considerable space required between the sensitized material holder 108 and the original holder 101. Therefore, a conventional slitwise exposure type copying camera is not suitable for variable scale magnification.

SUMMARY OF THE INVENTION

Therefore, an object of the present invention is to solve the aforementioned difficulties.

The above described objects of the present invention can be attained by a compact slitwise exposure camera, including: a holder for holding an original; scanning means for optically scanning the original while the original is held by the holder and for exposing a sensitized material as a function of the scanned original, the scanning means including an optical system which is movable relative to the holder; and a cylindrical conveyor for releasably holding the sensitized material to be exposed by the scanning means, the conveyor conveying the sensitized material in synchronization with the scanning means to permit the scanning means to record slitwise images of the original on the sensitized material.

Since the slitwise exposure type camera for reproduction comprises the above described components, the sensitized material conveying means and the original holding means, which were opposed to each other in the prior art, are not opposed. Consequently, a compact slitwise exposure type camera for reproduction can be provided.

According to a preferred embodiment of the present invention, the optical system comprises a variable scale magnification optical system which turns the original image into an image of a prescribed size in accordance with a given relation, comprising a relation of variable scale magnification for turning the original image into an image of a prescribed size.

Since the slitwise exposure type camera for reproduction is structured as described above, a slitwise exposure type camera for reproduction can be provided which is compact and capable of variable scale magnification.

According to a more preferred embodiment of the present invention, the cylindrical sensitized material conveying means comprises a cylindrical drum serving as a guide for conveying the sensitized material, and a sensitized material holding means for holding the sensitized material on the cylindrical drum. The sensitized material holding means comprises charging means for holding the sensitized material using static electricity.

Since the slitwise exposure type camera for reproduction comprises the above described components, the sensitized material is attracted onto the cylindrical drum by the static electricity. There is no external force applied on the cylindrical drum when the sensitized material is attracted on the cylindrical drum to be conveyed. Therefore, there is no vibration on the cylindrical drum. Consequently, a slitwise exposure type camera for reproduction can be provided in which the resolution is not degraded.

According to a more preferred embodiment of the present invention, the cylindrical drum is formed of a conductive material and has an outer cylindrical surface and a support for rotatably supporting the drum itself; the charging means comprises a direct voltage applying device for generating electricity for charging; and the electricity is transmitted onto the outer cylindrical surface of the cylindrical drum through the support axis.

Since the slitwise exposure type camera for reproduction comprises the above described components, the whole cylindrical drum can be charged if only a direct voltage applying device is provided. Consequently, a slitwise exposure type camera for reproduction can be provided which has cylindrical sensitized material holding means of a simple structure capable of holding a sensitized material.

These objects and other objects, features, aspects and advantages of the present invention will become more apparent from the following detailed description of preferred embodiments when taken in conjunction with the accompanying drawings.

DESCRIPTION OF THE PREFERRED EMBODIMENTS

Figure 1:
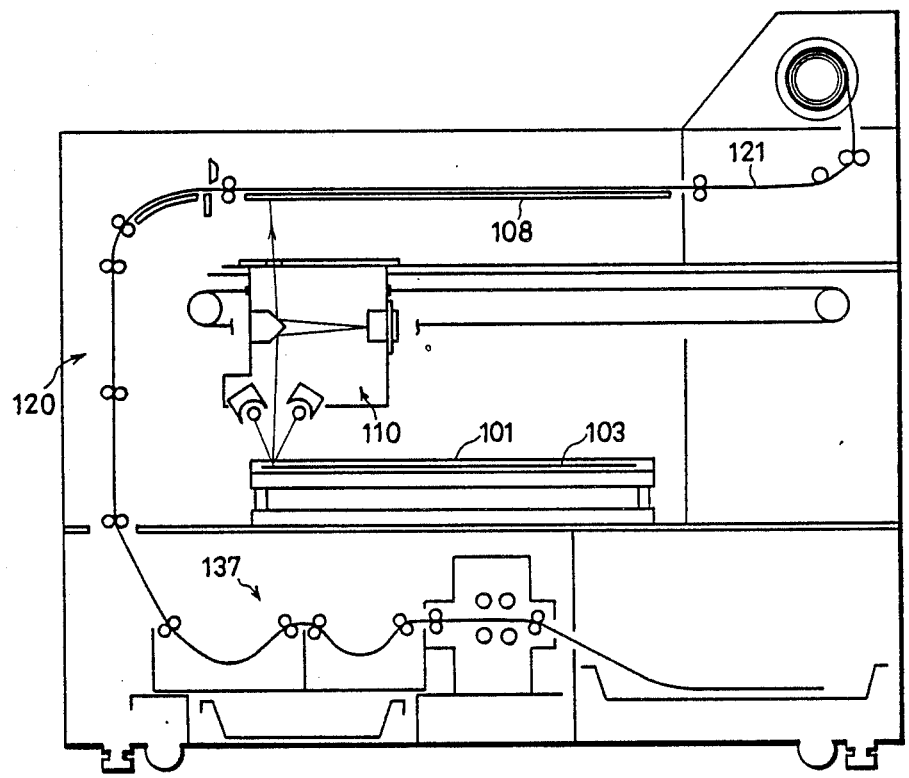
FIG. 1 illustrates a conventional slitwise exposure type camera for reproduction.
Figure 2:
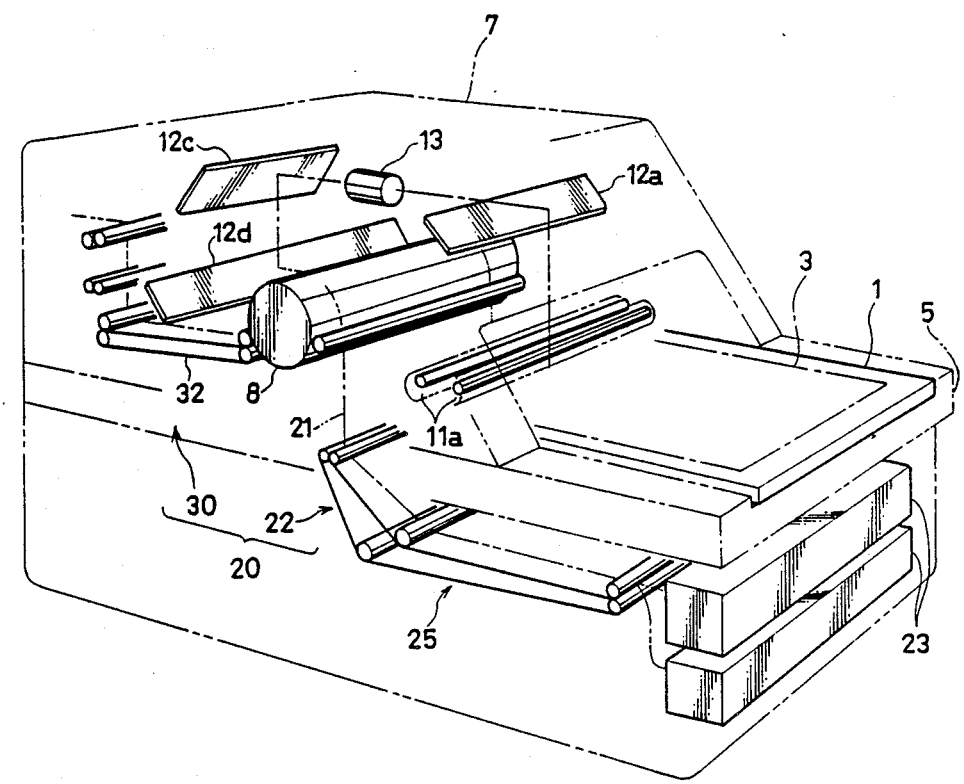
FIG. 2 is a perspective view schematically illustrating a camera in accordance with the present invention.
Figure 3:
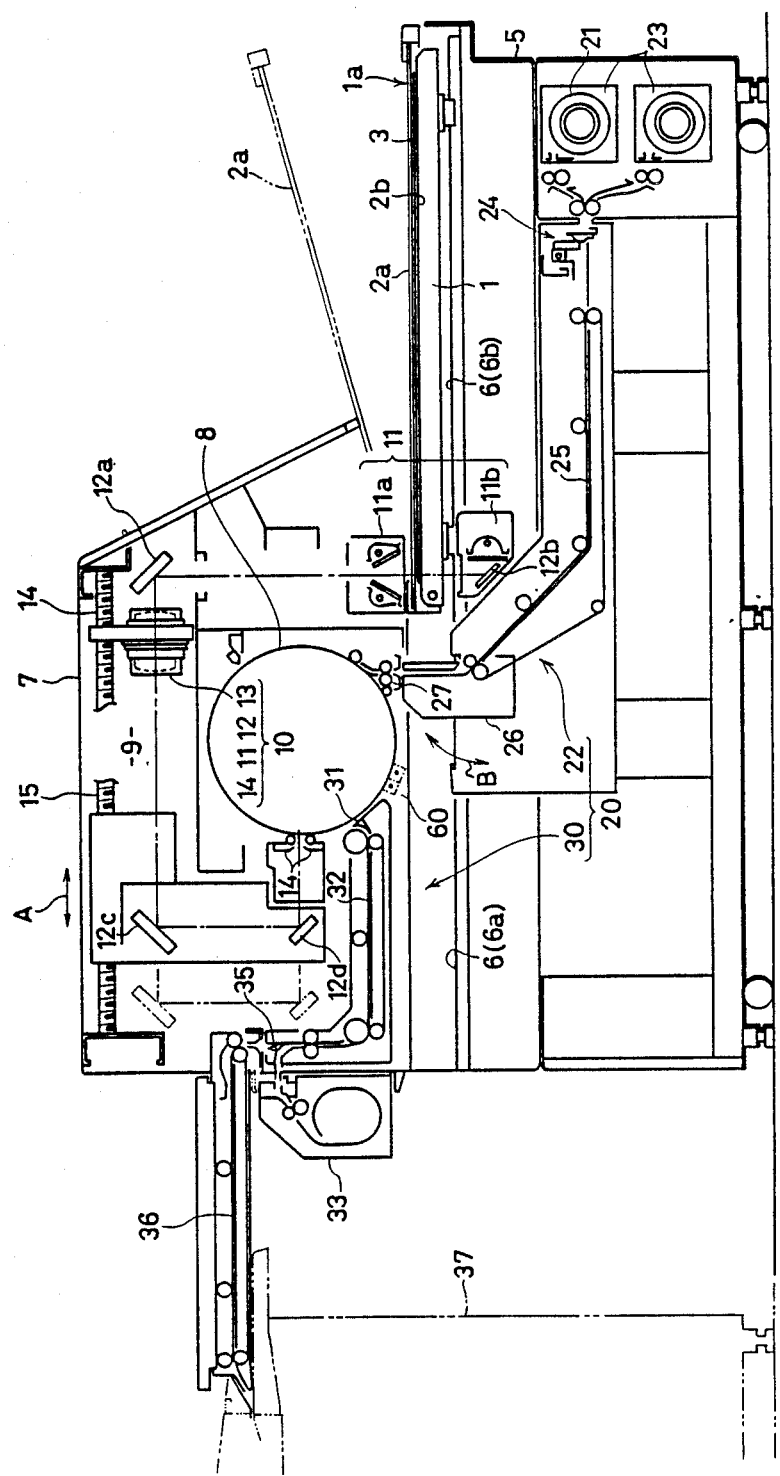
FIG. 3 is a schematic cross sectional view of a camera in accordance with the present invention.

Referring to FIGS. 2 and 3, a preferred embodiment includes a holder 1 for holding an original 3 in a flat position. The original holder 1 is horizontally movable along a path 6. The preferred embodiment further includes a cylindrical drum 8 which is rotatable in synchronization with the movement of the original holder 1. The cylindrical drum 8 is adapted to hold sensitized material 21. The drum 8 is pivotally supported above the path 6. The preferred embodiment further includes a projecting optical system 10 for forming an image of the original 3 at variable scale magnification. The optical system 10 is arranged in a space 9 around the outer periphery of the cylindrical drum 8. A conveying apparatus 20 is adapted to feed-discharge the sensitized material 21 to and from the cylindrical drum 8. The original holder 1 and the sensitized material holding drum 8 are driven in synchronization with each other. Slitwise images of the original 3 are projected on the sensitized material (while the material is held on the drum 8) through the projecting optical system 10 for variable scale magnification.

The original holder 1 is movable along a rail on a base frame 5 (i.e., along the path 6) with the original 3 pressed and held between two transparent plates 2a and 2b.

The path 6 includes an inner moving path 6a (which is inside of the camera casing 7) and an outer moving path 6b (which extends outside of the camera casing 7). The original holder 1 (on which the original 3 is deposited) is arranged on the outer moving path 6b. The original holder 1 is moved to an original portion of the inner moving path 6a and then moved to the outer moving path 6b during a scanning exposure cycle. The preferred embodiment includes an upper transparent plate 2a for contacting and applying pressure to the original 3. To place the original 3 on (and remove the original 3 from) the original holder 1, the plate 2a is opened to an operating side (as illustrated in phantom lines in FIG. 3). Scanning exposure is started from an operation side end 1a of the original holder 1 (the right side end of the original holder as illustrated in FIG. 3).

Only one side of the original 3 should be aligned with the operating side end 1a of the original holder 1. This is especially convenient when the original 3 is large.

The sensitized material 21 is conveyed from the conveying apparatus 20 from a cassette 23 to be wound on the cylindrical drum 8. The sensitized material 21 must be conveyed in synchronization with the rotation of the cylindrical drum 8. The following methods are proposed for this purpose.

1. First Embodiment

In the first embodiment, the sensitized material is attracted and held on the outer cylindrical surface of the cylindrical drum by static electricity.

Figure 4:
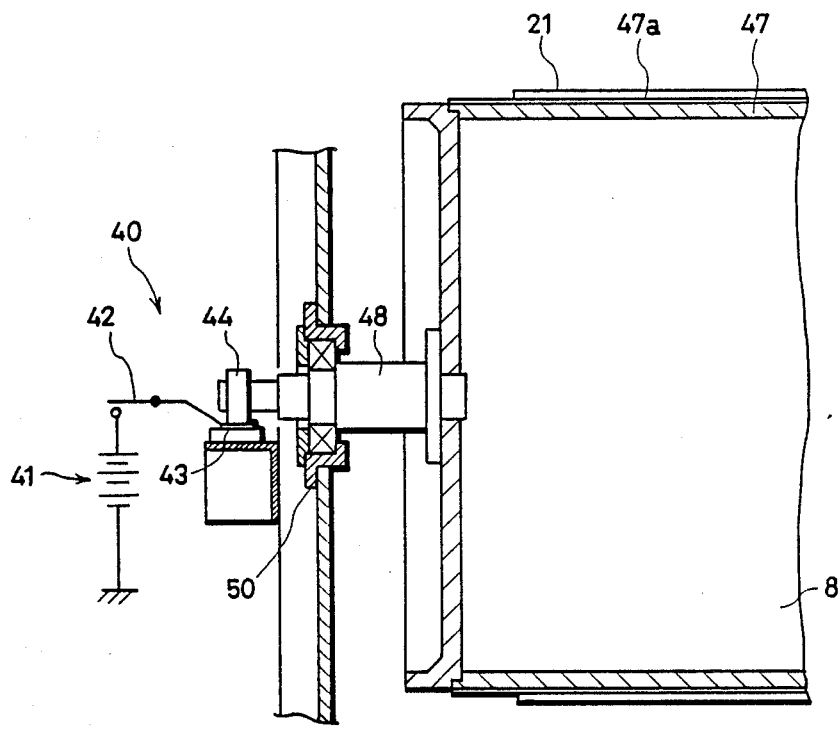
FIG. 4 shows a first embodiment of the present invention.

Referring to FIG. 4, the cylindrical drum 8 is formed of a conductive light material (such as aluminum) and is connected to a charging device 40 for charging electrostatic charges on the surface of the drum. The charging device 40 includes a power supply 41 for applying direct voltage; a switch 42; and conductive connectors 43 and 44 for connecting the power supply 41 to the drum 8 through a support shaft 48.

The power supply 41 preferably holds the potential of the drum surface at about $1 \sim 3$ KV. When a polyester base film is used as the sensitized material, $1 \sim 2$ KV of surface potential is sufficient for attracting and holding the material to the drum. Even if the polyester base film is strongly curled from being on a roll surface potential of $2 \sim 3$ KV is sufficient for the attraction and holding. If higher surface potential is applied, fog will be caused by discharge when the film 21 is separated from the drum or dust will be attracted to and deposited on the surface of the sensitized material. This causes a number of pin holes to be generated on an exposed and developed film plate.

The surface of the drum 8 is preferably covered by a dielectric film 47a so that there will be no leak even if an operator touches the surface during maintenance of the apparatus and so on. If a charger 60 (indicated in dotted lines in FIG. 3), which will be described later, is used as the charging device, the dielectric film 47a must be provided. The dielectric film 47a is preferably black so that, when a film is used, light transmitted through the film is not reflected on the surface of the drum.

Reference numeral 50 (FIG. 4) denotes a bearing flange made of an insulating resin.

In the above described embodiment, the charging device applies direct voltage to the drum through the support shaft. However, a known charger 60 (indicated in dotted lines in FIG. 3) for generating a corona discharge may be arranged near the outer cylindrical surface of the drum 8.

When the charger 60 is employed, the charging is effected while the drum 8 is rotated. The drum 8 need not be rotated when the charging device 40 is used and is convenient in controlling the rotary position of the drum 8. More specifically, the drum 8 can be charged while the drum 8 is stationary with the tip end of the sensitized material aligned with a reference position for drum rotation at the start of exposure.

The cylindrical drum 8 is rotated in synchronization with the movement of the original holder 1 in accordance with a prescribed set magnification rate by a rotary driving source (not shown) which is different from the scanning driving source (not shown) of the original holder 1. In this embodiment, the rotation of the cylindrical drum 8 is constant regardless of the set magnification rate while the speed of the original holder 1 is changed according to the set magnification rate. The synchronous driving technique is known, the details thereof are omitted.

The projecting optical system 10 for variable scale magnification is arranged in a space 9 around the cylindrical drum 8 in the camera casing 7. The optical system 10 includes an illuminating lamp 11, a plurality of mirrors 12a to 12d, an image forming lens 13, and a set of slit plates 14 for adjustment of the width of the slit.

The lamp 11 includes a reflecting lamp 11a arranged on the upper side of the path 6 and a transmitting lamp 11b arranged in the lower side of the path 6. The lamps 11a and 11b are selectively operated in accordance with the type of original to be scanned.

The image forming lens 13 and the mirrors 12c and 12d (which are located behind the lens) are independently moved in the direction of the arrow A by separate driving ball threads 14 and 15, respectively. Accordingly, the ball threads 14 and 15, respectively, to change the magnification ratio of the camera conveying apparatus 20 includes a feeding device 22 for the sensitized material 21 to the cylindrical drum 8, and a discharging device 30 for discharging the sensitized material 21 from the cylindrical drum 8. The feeding device 22 includes a rollfilm cassette 23; a cutter 24 which cuts the film 21 to a required length as the film is fed from the cassette 23; a belt conveyor for conveying the film 21 to the drum 8; a guiding member 26 (which is rotatable in the direction of the arrow B) for guiding the film 21 from the belt conveyor 25 to the drum 8 across the path 6; and a feed roller 27 for feeding the film 21 toward the drum 8.

The discharging device 30 comprises a separating pawl 31 which is in contact with the cylindrical drum 8 for separating the exposed film 21 from the drum 8; a discharging belt conveyor 32; and a film magazine 33. In FIG. 3, reference numeral 37 denotes an automatic developer for developing the sensitized material 21; reference numeral 36 denotes a conveyor for conveying the sensitized material 21 to the automatic developer 37; and reference numeral 35 denotes a guide plate for switching the direction of the film to the film magazine 33 or to the automatic developer 37.

The operation of the above described copying camera will be briefly described in the following.

First, when the power is turned on, the positions of the image forming lens 13, the mirrors 12c·12d and the cutter 24 are reset.

Thereafter, conditions for taking image such as the reproduction magnification ratio, conditions for exposure, and the length of film are inputted from an operating panel, not shown. Thereafter, when a film set button (not illustrated) is pressed, electrostatic charges are charged on the surface of the drum 8 by the charging device, and the image forming lens 13 and the mirrors 12c and 12d are moved to positions corresponding to the set magnification ratio. Meanwhile, the sensitized material 21 is fed out from the cassette 23 and cut to the required length by the cutter 24.

The cut film 21 is transferred through the conveyer 25, the guiding member 26 and the feed roller 27 to be wound around the cylindrical drum 8, and the cylindrical drum 8 is stopped at a drum origin position (not illustrated).

The original 3 is set in the original holder 1 after the film set button is pressed and before the sensitized material 21 is held on the cylindrical drum 8.

Thereafter, when an exposure start button (not illustrated) is pressed, the guiding member 26 (which intercepted the path 6 of the original holder 1) is turned in the direction of the arrow B to open the path 6, and the original holder 1 is transported to the inner portion of the inner moving path 6a to be positioned at the origin. At this position, the operating side end 1a of the original holder 1 is placed deeper than the position of the exposure optical axis.

Simultaneously with the rotation of the drum 8, the illuminating lamp 11 is turned on, the original holder 1 is moved in accordance with the reproduction magnification ratio, and the drum 8 is rotated in synchronization with the movement of the holder 1.

When the original holder 1 has been moved by a prescribed length and is on the outer moving path 6b, the illuminating lamp 11 is turned off and the original holder 1 is returned to the original setting position. The exposed film 21 is separated from the drum 8 by the separating pawl 31 from the starting end side, and is stored in the film magazine 33 or fed to the automatic developer 37 through the conveyor 32. The charging device is turned off when the sensitized material 21 is fully separated from the drum 8.

A image pickup cycle is repeated in the similar manner.

2. Second Embodiment

In a second embodiment, the sensitized material is vacuum-attracted onto the cylindrical drum.

Figure 5A:
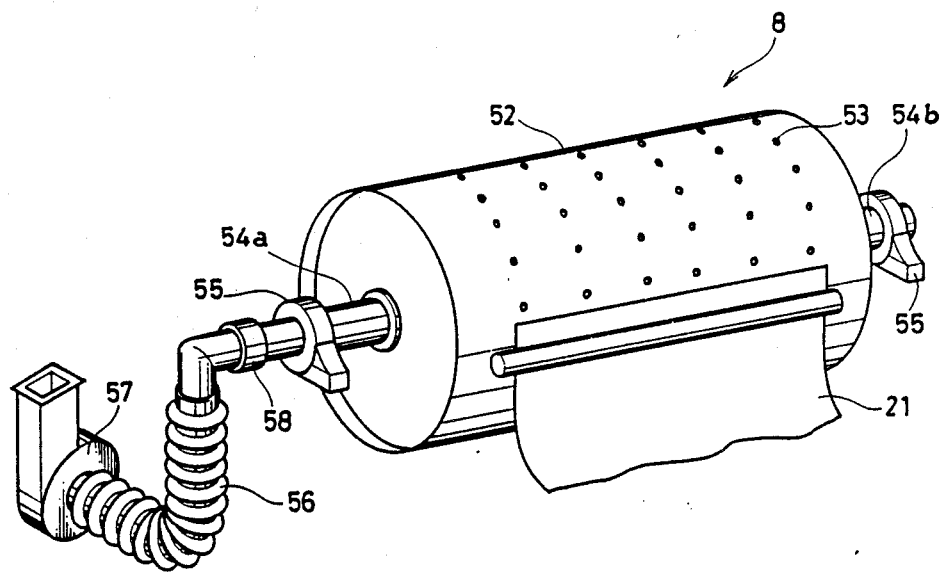
FIG. 5A is a perspective view of details of a drum in accordance with a second embodiment of the present invention.
Figure 5B:
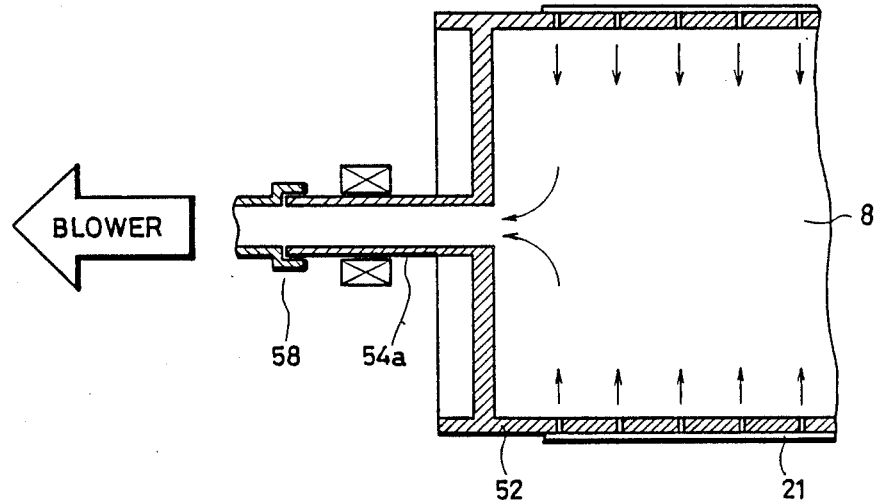
FIG. 5B is a partial sectional view of the drum illustrated in FIG. 5A.

Referring to FIGS. 5A and 5B, the cylindrical drum 8 includes a hollow drum body 52, and bosses 54a and 54b provided on central portions of end portions of the drum body 52 for rotatably holding the drum body 52. The boss 54a on one side is hollow while the boss 54b on the other side is solid. The bosses 54a and 54b are supported by bearings 55. A plurality of through holes 53 are formed on the peripheral surface of the hollow drum body 52. An end portion of the hollow boss 54a is connected to a blower 57 through a flexible tube 56. A driving source (not shown) for rotating the body 52 is connected to the side of the solid boss 54b. A special coupling 58 is provided at a connecting portion of the flexible tube 56 and the end portion of the hollow boss 54a, so that the flexible tube 56 is not rotated even if the body 52 is rotated.

When the sensitized material 21 is conveyed in synchronization with the cylindrical drum 8, the blower 57 is operated and air is introduced from a plurality of through holes 53 provided on the outer periphery of the drum body 52 and discharged to the atmosphere through the hollow boss hole 54a as shown by the arrows of FIG. 5B. Thus, the sensitized material is attracted to the cylindrical drum 8 and is conveyed in synchronization with the cylindrical drum 8. Other portions of the second embodiment are the same as those of the first embodiment.

In the second embodiment, slight vibration may be generated on the cylindrical drum by the pulse of air supplied by the blower or a vacuum pump.

According to the present invention, the sensitized material is conveyed along and held on a drum and the apparatus is therefore compact. An optical system for variable scale magnification can be arranged within space defined by the compact apparatus. The sensitized material is held on the drum by static electricity without vibration. However, the drum may be slightly vibrated when the sensitized material is held by vacuum attraction. A slitwise exposure type camera for reproduction is provided which is compact, capable of variable scale magnification, and in which image resolution is not degraded.

Although the present invention has been described and illustrated in detail, it is clearly understood that the same is by way of illustration and example only and is not to be taken by way of limitation. The spirit and scope of the present invention should be limited only by the terms of the appended claims.

What is claimed is:

1. A compact slitwise exposure camera, comprising:
   a movable holder for holding an original;
   scanning means for optically scanning said original while said original is held by said holder and for exposing a sensitized material as a function of said scanned original, said scanning means including an optical system which is movable relative to said holder; and a cylindrical conveyor for releasably holding said sensitized material to be exposed by said scanning means, said conveyor conveying said sensitized material in synchronization with said holder to permit said scanning means to record slitwise images of said original on said sensitized material; and wherein:

said optical system is capable of varying the magnification of said images;

said conveyor is synchronized with said holder to record said magnified images on said sensitized material;

said holder holds said original in a flat position and wherein said camera further comprises moving means for moving said holder in such a manner that said original is moved along a flat plane; and said cylindrical conveyor is located above said flat plane.

2. The camera of claim 1, wherein:

said optical system is capable of varying the magnification of said images; and said conveyor is synchronized with said holder to record said magnified images on said sensitized material.

3. A compact photomechanical slitwise exposure camera, comprising:

a movable holder for holding an original;

scanning means for optically scanning said original while said original is held by said holder and for exposing a sensitized material as a function of said scanned original, said scanning means including an optical system; and a conveyor for conveying said sensitized material, said conveyer including a cylindrical drum and sensitized material holding means for releasably holding said sensitized material on said cylindrical drum, said conveyor conveying said sensitized material in synchronization with said movable holder to permit said scanning means to record slitwise images of said original on said sensitized material while said sensitized material is held on said cylindrical drum by said holding means;

wherein said sensitized material holding means includes means for holding said sensitized material on said cylindrical drum by static electricity.

4. A compact slitwise exposure camera, comprising:

a movable holder for holding an original;

scanning means for optically scanning said original while said original is held by said holder and for exposing a sensitized material as a function of said scanned original, said scanning means including an optical system which is movable relative to said holder; and a cylindrical conveyor for releasably holding said sensitized material to be exposed by said scanning means, said conveyor conveying said sensitized material in synchronization with said holder to permit said scanning means to record slitwise images of said original on said sensitized material; and wherein:

said optical system is capable of varying the magnification of said images;

said conveyor is synchronized with said holder to record said magnified images on said sensitized material;

said holder holds said original in a flat position and wherein said camera further comprises moving means for moving said holder in such a manner that said original is moved along a flat plane; and said cylindrical conveyor is located above said flat plane.

5. The camera of claim 4, wherein said optical system is located outside of said cylindrical conveyor.

6. The camera of claim 1, wherein said sensitized material holding means includes means for holding said sensitized material on said cylindrical drum by static electricity.

7. The camera of claim 6, wherein said cylindrical drum includes an outer cylindrical surface for supporting said sensitized material; and wherein said camera further includes a support axis for rotatably supporting said cylindrical drum.

8. The camera of claim 7, wherein said sensitized material holding means includes means for applying an electrostatic charge at said outer cylindrical surface.

9. The camera of claim 8, wherein said outer cylindrical surface of said cylindrical drum is covered by dielectric material.

10. The camera of claim 8, wherein said applying means includes a corona discharger.

11. The camera of claim 8, wherein said applying means comprises a voltage source and means for applying voltage from said voltage source to said outer cylindrical surface through said support axis.

* * * * *